United States Patent
Collis et al.

(10) Patent No.: US 7,032,896 B2
(45) Date of Patent: Apr. 25, 2006

(54) PISTON-CYLINDER ASSEMBLY WITH A BELLOWS

(75) Inventors: John Collis, Eitorf (DE); Volker-Oliver Hupperich, Sankt Augustin (DE)

(73) Assignee: ZF Sachs AG, Schweinfurt (DE)

(*) Notice: Subject to any disclaimer, the term of this patent is extended or adjusted under 35 U.S.C. 154(b) by 526 days.

(21) Appl. No.: 10/144,328

(22) Filed: May 13, 2002

(65) Prior Publication Data
US 2002/0189441 A1 Dec. 19, 2002

(30) Foreign Application Priority Data
May 11, 2001 (DE) ................. 101 22 796

(51) Int. Cl.
F16F 5/00 (2006.01)
F16F 9/36 (2006.01)
(52) U.S. Cl. .................. 267/122; 267/220; 188/322.17
(58) Field of Classification Search ............... 267/220, 267/221, 140, 152, 153, 33, 64.23, 64.24, 267/122; 188/322.17; 280/124.146, 124.147
See application file for complete search history.

(56) References Cited

U.S. PATENT DOCUMENTS

| | | | |
|---|---|---|---|
| 4,771,996 A * | 9/1988 | Martinez et al. | 267/220 |
| 5,120,031 A * | 6/1992 | Charles et al. | 267/220 |
| 5,636,831 A * | 6/1997 | Gubitz | 267/64.24 |
| 5,901,947 A * | 5/1999 | Fotino et al. | 267/220 |
| 6,199,844 B1 * | 3/2001 | McCormick et al. | 267/221 |

FOREIGN PATENT DOCUMENTS

| | | |
|---|---|---|
| DE | 650 195 | 9/1937 |
| DE | 1 965 945 | 9/1967 |
| DE | 91 09 202 | 11/1991 |
| DE | 41 37 447 | 5/1992 |
| DE | 196 41 728 | 4/1998 |
| DE | 19641728 A1 * | 4/1998 |
| DE | 199 33 783 | 1/2001 |

OTHER PUBLICATIONS

Prof. Dr.-Ing.. Dr. h.c. Günter Spur: Handbuch der Fertigungstechnik, Band 5: Fügen, dhaben und Montieren, Carl Hanser Verlag München Wien 1986, S. 600 bis 605.

* cited by examiner

*Primary Examiner*—Robert A. Siconolfi
(74) *Attorney, Agent, or Firm*—Cohen, Pontani, Lieberman & Pavane

(57) ABSTRACT

Piston-cylinder assembly, comprising a container tube, in which a piston rod is guided with freedom of axial movement, which rod is at least partially covered by a sheath tube with at least one elastic fold, where a resilient stop pad is provided concentrically to the piston rod, the end of which pad comes to rest against an end cap during the inward travel of the piston rod, which end cap rests against the container tube in the fully assembled piston rod assembly. The stop pad, the sheath tube, and the end cap form a preassembled unit which is independent of the piston rod assembly, the end cap being pressed onto the container tube by the resilient stop pad during the inward travel of the piston rod into the container tube.

13 Claims, 2 Drawing Sheets

PISTON-CYLINDER ASSEMBLY WITH A BELLOWS

BACKGROUND OF THE INVENTION

1. Field of the Invention

The invention pertains to a piston-cylinder assembly of the type having a piston rod which is guided axially in a container tube and at least partially covered by a bellows. A resilient stop pad installed concentrically on the piston rod comes to rest on an end cap fitted to the container tube at the end of inward travel of the piston rod.

2. Description of the Related Art

DE 1 965 945 A1 describes a piston-type shock absorber, the piston rod of which is covered by a resilient stop pad combined with a bellows. The resilient stop pad and the bellows form an independent assembly, the bellows being attached to the bottom end of the resilient stop pad. As a result, the end of the resilient stop pad is held coaxially on the adjacent end of the bellows. The end of the bellows facing the cylinder is positioned radially by a sleeve section of the spring collar. No provision is made for holding the end of the bellows in position axially with respect to the sleeve section. On the contrary, it can be assumed that this end of the bellows is free to move in the axial direction within a predetermined scope between the spring collar and one edge of the stop sleeve. At the maximum amount of inward travel, the resilient stop pad is supported on the stop sleeve. The bellows, at this maximum amount of inward travel, does not absorb any of the compressive forces being exerted on any of the components of the piston-type shock absorber.

DE 91 09 202 U1 describes a cylinder tube end cap for a vibration damper. In an exemplary embodiment, a circumferential edge of this cap enters into a form-locking connection with a bellows. The bellows itself is clamped between a disk, against the bottom of which a resilient stop pad is supported, and an elastic support body. During assembly, the cylinder tube end cap is pressed onto the end of the container tube. Then the resilient stop pad is pushed onto the piston rod, and the bellows is snapped onto the disk mentioned above. The cylinder tube end cap and the bellows cannot be made as a prefabricated assembly, because otherwise the disk with the resilient stop pad could no longer be introduced into the bellows.

DE 41 37 447 A1 discloses a telescoping shock absorber, on the piston rod outlet end of which an end cap is attached to the container tube. In addition, the piston-cylinder assembly includes a resilient stop pad, which is supported axially against a spring collar. A bellows is snapped into a sleeve part of a spring collar on the vehicle body side of the assembly. During final assembly of the piston-cylinder assembly, the pretension in the pushing direction pushes the bottom end of the bellows into a form-locking connection with a circumferential edge of the end cap. For this purpose, the bottom end of the bellows must be able to expand in the radial direction. In the case of a vehicle suspension spring with a comparatively small inside diameter, it is possible for the bottom edge of the bellows to come into contact with the suspension spring, which makes it impossible to execute the required installation motion.

It is also necessary for the bellows to be relatively stiff, which can be accomplished by the choice of material out of which it is made or its geometry. This relative stiffness, however, has a negative effect on the fatigue strength of the bellows. The relationship here, however, is that the greater the stiffness, the greater the stress within the material of the bellows during the continual inward and outward travel of the piston-cylinder assembly.

SUMMARY OF THE INVENTION

The object of the present invention is to realize a vibration damper with a bellows which can be installed even in a very confined radial space.

According to the invention, the resilient stop pad, the sheath tube or bellows, and the end cap form a preassembled unit which is independent of the piston-cylinder assembly, and the end cap is pressed onto the container tube by the resilient stop pad as the piston rod travels into the container tube.

The unit consisting of the sheath tube, the resilient stop pad, and the end cap can be assembled independently of the amount of space available for the piston-cylinder assembly. Any suspension springs which may be present, as are normally used in a MacPherson strut unit, do not present any obstacle to the assembly work. In addition, the advantage is obtained that the end cap is pressed on without any effect on the sheath tube. It is therefore also possible to use a bellows whose service life is not negatively affected by the assembly process.

In a further advantageous embodiment of the invention, the resilient stop pad has at least one form-locking profile, e.g., an undercut, with which the sheath tube can engage in a form-locking manner. Thus an axially tight and above all defined connection is obtained between the sheath tube and the resilient stop pad.

According to an advantageous embodiment, the end of the resilient stop pad facing away from the end cap enters into the form-locking connection with the sheath tube. So that the piston rod can also have the best possible protection at the other end of the sheath tube, at least certain sections of the end cap are provided with a circumferential edge for connecting the cap to the tube, this edge engaging in a form-locking manner with the sheath tube. The edge area of the end cap is designed with elasticity in the radial direction.

It is possible for the end cap to have axial slots, which divide the edge into individual segments. The end cap is elastic in the radial direction in the area of the slots, which facilitates the process of connecting the cap to the tube.

To simplify the assembly work, the part of the end cap with the edge projects axially beyond the sheath tube. By means of a suitable tool such as a sleeve with an internal cone, the segments of the end cap can be deformed radially inward in a uniform manner to make it easier for the segments to connect with the sheath tube.

In a further advantageous embodiment, the resilient stop pad has a cylindrical section, which, together with a fastening part of the sheath tube, is pressed into a sleeve section of a fastening element on the piston rod side. The press-in connection can be either of the form-locking type or of the friction-locking type. The sleeve section serves to center the resilient stop pad and to transmit the forces introduced during the pressing-on of the end cap via the resilient stop pad. The phrase "piston rod side" is to be understood in that, although the fastening element is in a fixed axial position with respect to the piston rod, it does not have to be connected directly to the piston rod.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
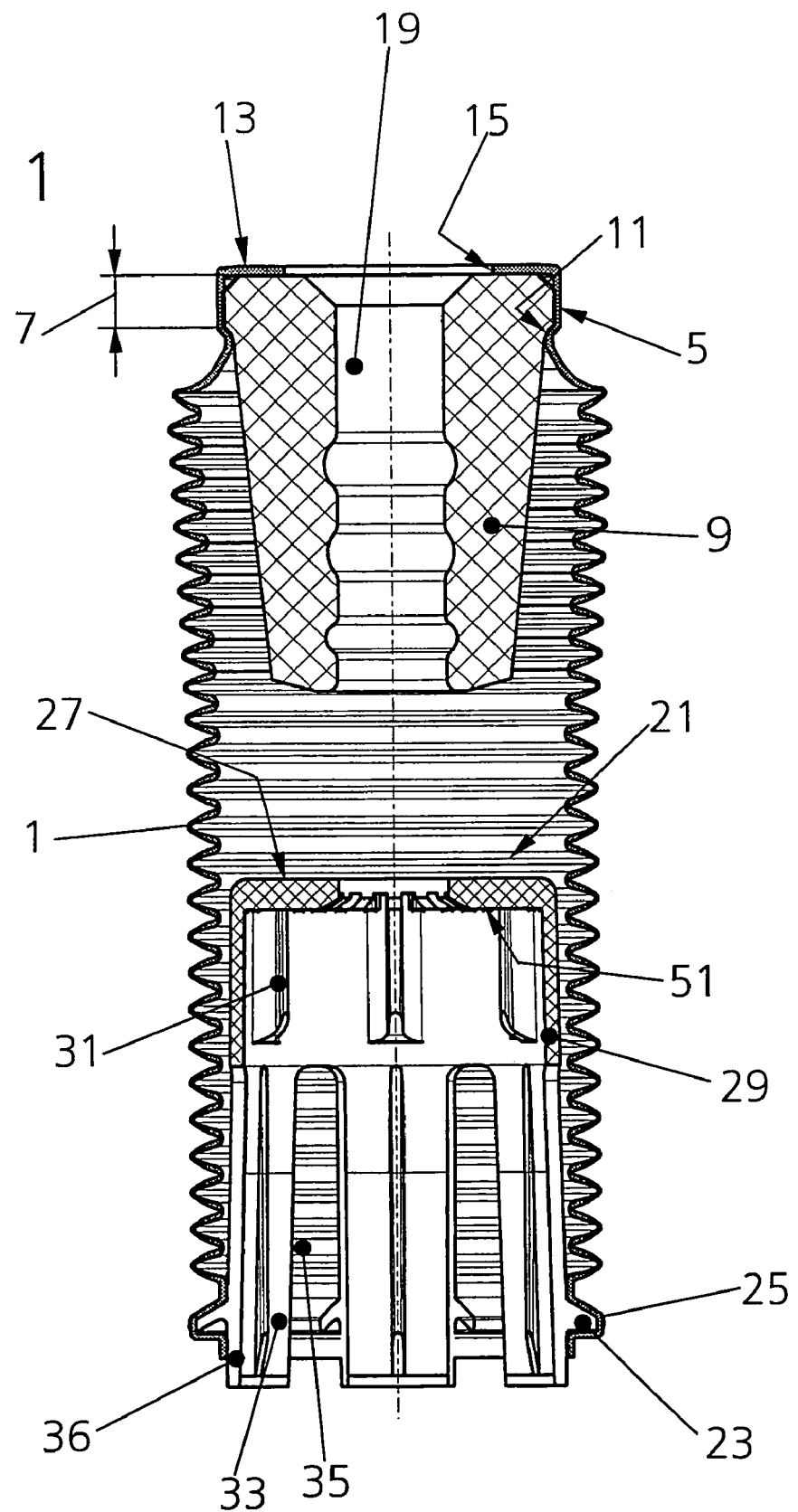
FIG. 1 show a sheath tube with a resilient stop pad and an end cap as a single unit.

FIG. 1 shows a sheath tube 1 for a piston-cylinder assembly 3, where the sheath tube has at least one fold with elasticity in the axial direction. After the resilient stop pad 9 has been installed through the bottom end of the sheath tube, a cylindrical section 7 at the end of the pad enters into a form-locking connection with a fastening part 5 of the tube. The pad 9 consists of an elastomer, a rubber, or a rubber-like material. To reinforce the connection, the resilient stop pad has a form-locking profile in the form of a circumferential undercut 11, with which the sheath tube 1 engages. In addition, the sheath tube has a top end 13, which is supported on the end surface of the resilient stop pad. Thus the sheath tube reliably assumes a clearly defined axial position with respect to the resilient stop pad 9, which can also be easily verified. A through-hole 15 for the piston rod 17 of the piston-cylinder assembly 3 is provided in the top end of the tube. This through-hole 15 is slightly larger than a receiving opening 19 in the resilient stop pad, which means that part of the end surface of the cylindrical section 7 of the pad is still visible even after assembly.

An end cap 21 is connected to the sheath tube by pushing it through the bottom end of the tube. For this purpose the end cap has a circumferential flange 23, which fits in a circumferential channel 25 of the sheath tube. The end cap 21 has a cup-like base part with a contact surface 27 for the resilient stop pad 9 and a centering sleeve 29, which has radially elastic guide webs 31 on its inside wall.

Extending from the centering sleeve 29 toward the bottom end of the sheath tube are elastic segments 33, which are separated from each other by axial slots 35. The circumferential flange 23 is spaced from the distal ends of these segments.

Each of the segments 33 has a section 36 projecting axially beyond the sheath tube 1. It is therefore possible to use a suitable tool to subject the segments 33 to uniform elastic deformation in such a way that the end cap can be locked into the sheath tube 1. In the completely assembled state, the axially projecting sections make it possible to verify that the components have been assembled properly. The unit consisting of the sheath tube 1, the resilient stop pad 9, and the end cap 21 can be preassembled in complete independence of the piston-cylinder assembly 3.

Figure 2:
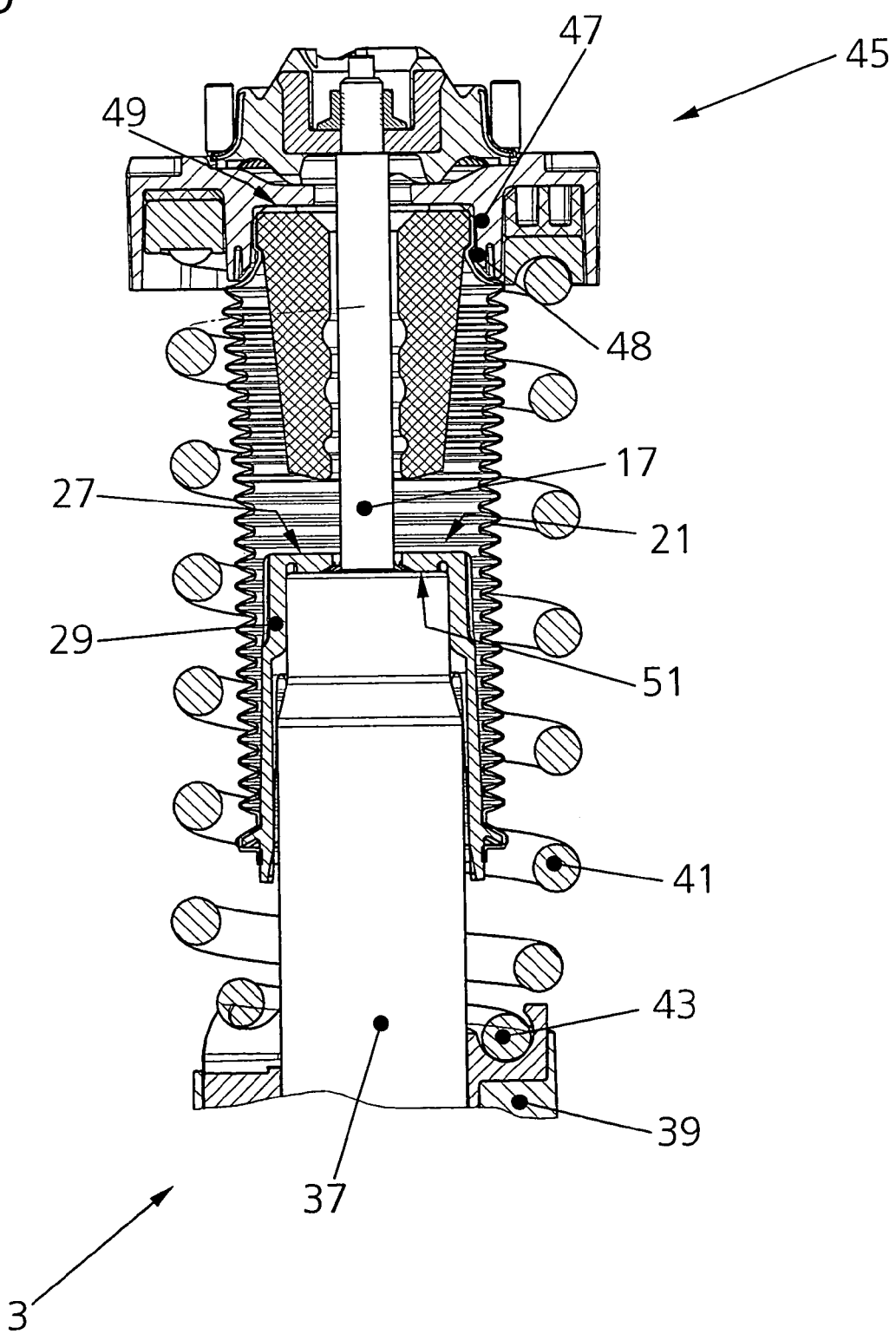
FIG. 2 shows a piston-cylinder assembly including the unit according to the invention.

FIG. 2 shows the piston-cylinder assembly 3, including here only the container tube 37. The piston-cylinder assembly can be a vibration absorber of any desired type, a pneumatic spring, or some type of hydraulic actuator.

The container tube carries a spring collar 39 for a vehicle suspension spring 41. The final turn 43 resting on the spring collar 39 has a smaller diameter than the shoulder 25 of the sheath tube 1.

The piston rod is connected to a fastening element 45 on the piston rod-side of the assembly, which element can be connected in turn to the body of a vehicle (not shown). The fastening element 45 has a cup-shaped sleeve section 47, which clamps and also centers the sheath tube 1 by its fastening part 5 against the cylindrical section 7 of the resilient stop pad 9. Finally, it is possible for the projections 48 on the circumference of the cup-shaped sleeve section 47 to engage with the form-locking profile 11 on the resilient stop pad 9 and the sheath tube 1, which improves the axial fixation of the sheath tube and the stop pad in the fastening element 45.

During the assembly process, the vehicle suspension spring 41 is pushed onto the spring collar 39 of the piston-cylinder assembly 3. In a second assembly step, the unit consisting of the sheath tube, the resilient stop pad, and the end cap is threaded onto the piston rod 17, and the end cap 21 is set down onto the end of the container tube 37 on the piston rod side. It is possible, as shown in the exemplary embodiment, to provide an installation bevel on the segments 33 and/or to reduce the diameter of the container tube 37 to make it easier to set the parts in position.

Then the fastening element 45 on the piston rod-side is positioned on the vehicle suspension spring 41. Finally, the fastening element 45 on the piston rod side is pushed against the force of the vehicle suspension spring toward the container tube 37. After a certain distance, the resilient stop pad 9 makes contact with the contact surface 27 of the end cap 21, and at the other end it comes to rest against an end surface 49 of the fastening element 45. As force continues to be exerted by the fastening element 45, the end cap 21 is pushed via the resilient stop pad onto the container tube 37 until the guide webs 31 on the end cap rest against the container tube, and the inside wall 51 of the support surface 27 (FIG. 1) comes to rest against the container tube. During this assembly movement, the segments 33 can expand radially to make the connection with the sheath tube 1 even stronger. The container tube 37 and the end cap 21 are held together by a press-fit as a result of the elastic guide webs 31, which hold the end cap securely in position. During the entire assembly motion, no load of any kind is exerted on the sheath tube 1. As a result of the way in which the forces are introduced, as described above, the sheath tube 1 and the resilient stop pad 9 are also pressed into the cup-shaped sleeve section 47 of the fastening element 45 until the sheath tube rests axially against the end surface 49 of the fastening element. As this happens, the projections 48 on the fastening element grip underneath the form-locking profile or undercut 11. The resilient stop pad 9 is also subjected to very little load, because the assembly force is introduced into the resilient stop pad 9 via the end surface 49 of the fastening element 45. Even though the ring-shaped space between the container tube 37 and the vehicle suspension spring 41 is very small, it is still possible to install the end cap 21 reliably on the container tube.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston cylinder assembly comprising:
    a container tube,
    a piston rod guided axially in said container tube,
    a resilient stop pad fitted concentrically to the piston rod,
    an end cap fitted to the container tube, said end cap being pressed onto the container tube by the resilient stop pad when the piston rod is moved into the container tube, and
    a sheath tube fitted to said stop pad and to said end cap, said sheath tube having at least one elastic fold and covering said piston rod between said stop pad and said end cap, said sheath tube, said resilient stop pad, and said end cap being formed as separate parts and assembled to form a preassembled unit which can stand independently of said piston rod and said container tube.

2. A piston-cylinder assembly as in claim 1 wherein said resilient stop pad comprises a form-locking profile which engages said sheath pad in a form-locking manner.

3. A piston-cylinder assembly as in claim 2 wherein said resilient stop pad has an end facing away from said end cap, said form-locking profile being formed on said end.

4. A piston-cylinder assembly as in claim 1 wherein said end cap comprises a circumferential flange which engages said sheath tube in a form-locking manner, said end cap having a radially resilient area near said flange.

5. A piston-cylinder assembly as in claim 4 wherein said end cap comprises axial slots which divide said flange into segments, said circumferential flange being formed on said segments.

6. A piston-cylinder assembly as in claim 1 further comprising a fastening element having a sleeve section, said resilient stop pad having a cylindrical section which engages inside said sheath tube and together with said sheath tube is pressed into said sleeve section.

7. A piston-cylinder assembly as in claim 1 wherein said end cap extends axially beyond said sheath tube.

8. A piston-cylinder assembly as in claim 1 wherein said sheath tube is a bellows.

9. A piston-cylinder assembly as in claim 4 wherein said sheath tube has a circumferential channel, said circumferential flange engaging in said channel in a form-locking manner.

10. A piston-cylinder assembly as in claim 5 wherein said segments have distal ends, said circumferential flange being spaced from said distal ends.

11. A piston-cylinder assembly as in claim 1 wherein said sheath tube has a top end fitted to said stop pad and a bottom end fitted to said end cap.

12. A piston-cylinder assembly as in claim 11 wherein said end cap extends axially beyond said bottom end of said sheath tube.

13. A piston-cylinder assembly as in claim 11 wherein said stop pad is received in said bottom end of said sheath tube prior to fitting said bottom end to said end cap.

* * * * *